United States Patent [19]

Droog

[11] Patent Number: 5,093,139

[45] Date of Patent: Mar. 3, 1992

[54] METHOD OF PREPARING ROASTED SUNFLOWER SHELLS

[76] Inventor: Tom Droog, Box 767, Bow Island, Alberta, Canada, T0K 0G0

[21] Appl. No.: 610,194

[22] Filed: Nov. 7, 1990

[30] Foreign Application Priority Data

Nov. 28, 1989 [CA] Canada .................. 2004016

[51] Int. Cl.$^5$ ............................................. A23L 1/36
[52] U.S. Cl. ................................ 426/93; 426/309; 426/466; 426/629
[58] Field of Search ............... 426/507, 93, 629, 466, 426/309

[56] References Cited

U.S. PATENT DOCUMENTS

| | | | |
|---|---|---|---|
| 3,567,465 | 3/1971 | Knechtel | 426/629 |
| 3,645,752 | 2/1972 | Baxley | 426/438 |
| 4,208,433 | 6/1980 | Barham | 426/93 |
| 4,436,757 | 3/1984 | Lange | 426/507 |
| 4,581,238 | 4/1986 | White | 426/507 |
| 4,595,596 | 5/1984 | Fazzolare | 426/629 |
| 4,657,766 | 4/1987 | Goodall | 426/309 |
| 4,761,296 | 8/1988 | Fazzolare | 426/629 |
| 4,859,486 | 8/1989 | Douglass | 426/629 |
| 4,942,043 | 7/1990 | Sander | 426/93 |

FOREIGN PATENT DOCUMENTS

| | | |
|---|---|---|
| 1213174 | 1/1986 | Canada . |
| 1235019 | 4/1988 | Canada . |
| 0068556 | 1/1983 | European Pat. Off. ............ 426/629 |
| 3219421 | 1/1983 | Fed. Rep. of Germany ...... 426/629 |

*Primary Examiner*—Carolyn Paden
*Attorney, Agent, or Firm*—McFadden, Fincham, Marcus & Anissimoff

[57] ABSTRACT

The present invention relates to a method of preparing roasted sunflower shells containing seeds having a generally uniform coating of a flavoring agent thereon, which comprises subjecting raw sunflower shells to an elevated temperature, roasting the raw sunflower shells, quenching and coating the roasted sunflower shells after the seeds in the shells have been roasted to a desired degree, with a liquid flavor containing coating solution having a temperature below the roasting temperature. The quenching is carried out by spraying a finely divided liquid flavor containing coating solution onto the roasted sunflower shells while the roasted sunflower shells are at or near a roasting temperature, and while the sunflower shells are being agitated, and thereafter cooling the resulting coated sunflower shells to a temperature below at which the quenching step has been carried out.

23 Claims, No Drawings

METHOD OF PREPARING ROASTED SUNFLOWER SHELLS

BACKGROUND OF THE INVENTION

This invention relates to the roasting process and to a product derived therefrom. More particularly, this invention relates to a process of coating roasted seeds contained in a shell, and to roasted, coated shell containing seeds.

DESCRIPTION OF THE PRIOR ART

There are many known processes and techniques for roasting nuts or kernels such as, for example, those described in Canadian Patents No. 1,213,174 issued Oct. 28, 1986 and Canadian Patent No. 1,235,019 issued Apr. 12, 1988.

In these patents, further reference is made to other United States patents for roasting nuts or seeds —that is, the edible product obtained after removing the shell, husk or skin of a natural product. For the sake of clarity, it will be understood when used in this specification that the term "shell containing seed(s)" refers to a product in which the nut, kernel or the like is contained within the shell or husk, and is not separated therefrom. On the other hand, with reference to the above prior art, such prior art only discloses treatment of the nut or kernel after the shell or husk has been removed.

For general purposes, such as an edible snack, seeds such as sunflower seeds are frequently sold as shell containing seeds where the user has to remove the shell; in many cases, the user will place such sunflower shells containing the seeds in his/her mouth, in order to obtain any flavour of the shell containing seed from the shell itself, and then either chew the shell gently to crack the shell, subsequently remove the edible seed and discard the shell - or alternately, the user will crack the shell manually, and then eat the edible seed.

It has been known to provide sunflower shells with a salt coating; normally, this is accomplished by roasting the raw shell containing seed in a roasting oven and during the actual roasting process, to introduce a salt solution as a single charge of the material into the roasting oven.

Roasting is generally carried out at elevated temperatures by introducing a sunflower shell product into a roasting oven, maintaining the heat or introducing heat to bring the sunflower shells up to a roasting temperature, e.g., 100 degrees C. and to maintain them at that temperature until the raw seed inside the shell is cooked or roasted. One of the features of introducing a salt solution into a roasting oven during the actual roasting process is that the solution, normally at room temperature, will cool the shells down considerably so that the shells have to be brought back up to roasting temperature to carry on the roasting process.

For commercial purposes, most sunflower shells that are introduced onto the consumer market have been heretofore coated with a salt solution, in the manner described above, and then packaged into consumer bags or containers. One of the problems with such products at the present time is that the sunflower shells come out of the roasting process as "spotty" products or basically where some of the shells do not have any coating or sometimes minimal coating—e.g., only a fraction of the surface of the shell is coated.

From a consumer point of view, such products are not visually as desirable as if one were able to provide a uniformly coated product, but due to the nature of the batch type process which is used to produce such shell products in a rotating kiln type roasting oven and due to the nature of the addition of the salt solution to the shell product, it is very difficult to obtain such desirable products.

Another factor that would be highly desirable from a commercial point of view for sunflower seeds is the property of being able to maintain a satisfactory shelf life for the product, and as well, one which has an improved taste which could only be obtained by a substantial uniform coating of a flavouring agent coated onto the shell. It will be understood that in the case of using salt as a flavouring agent, if a none uniform or spotty coating is obtained on the sunflower shell, it is believed that its freshness or its ability to retain its fresh tasting flavour of the seed or nut is reduced as the coating can otherwise tend to retard undesirable moisture or flavour absorption into the seed from the ordinary atmospheric or storage conditions.

SUMMARY OF THE INVENTION

With this invention, applicant has developed an improved technique of obtaining a substantially uniformly coated sunflower seed product, and a resulting product that has improved taste and visual characteristics due to the substantially uniform coating of a flavouring agent applied to the shell.

More particularly, in accordance with one aspect of this invention, there is provided a method of preparing roasted sunflower shells containing seeds having a generally uniform coating of a flavouring agent thereon, which comprises subjecting raw sunflower shells to an elevated temperature, roasting said raw sunflower shells, quenching and coating the roasted sunflower shells after the seeds in the shells have been roasted to a desired degree, with a liquid flavour containing coating solution having a temperature below the roasting temperature, the quenching being carried out by spraying a finely divided liquid flavour containing coating solution onto the roasted sunflower seeds while the roasted sunflower seeds are at or near a roasting temperature, and while the sunflower shells are being agitated, and thereafter cooling the resulting coated sunflower shells to a temperature below at which the quenching step has been carried out.

In another aspect of this invention, there is provided a roasted sunflower shell product having improved properties characterized in that the sunflower shell has a substantially uniform coating of a flavouring agent thereon, and by the absence of any surface spotting.

According to preferred embodiments of the present invention, the step of quenching and coating the sunflower shells is carried out just at or near the point where the seeds in the shells are substantially completely roasted so that upon feeding the coating solution to the heated sunflower shells, a quench takes place whereby the roasting process for the shells is killed and no further cooking of the seeds can take place. In other words, in the process of the present invention, the flavour containing coating solution is used as a quenching solution while at the same time providing the flavour additive for the shells.

In order to obtain a substantially uniform coating of the flavouring agent such as salt on the roasted sunflower shells, it has been found necessary, in accordance with the present invention, that the flavouring solution be applied only after roasting has been completed or substantially completed. It is believed that by carrying this procedure out, in the manner described above, (that is where the solution is applied after the sunflower shells are roasted), and with the solution acting as a quenching agent, the shell has a greater capacity to absorb and permit adherence of the solution to provide a more uniform coating with the resulting further characteristic of a more uniform colour for the product.

In carrying out the process of the present invention, preferably an aqueous flavour composition is employed which is utilized in the form of a very fine spray fed into a source of sunflower shells rotating in a roaster or like oven. The aqueous solution is composed of, any preferred form, a flavouring agent, fully dissolved in a carrier such as water, and fed under pressure in the form of a spray of fine droplets, or an atomized spray to the sunflower shells while they are at the roasting temperature. In preferred embodiments, the temperature of the coating composition is at between about 5 to 30 degrees C., and more desirably between 10 degrees to 20 degrees C. but in all cases, the temperature of the solution must be such as it acts as a quench to kill further cooking of the seeds in the sunflower shells.

Depending on the type of flavouring agent desired to be applied to the sunflower shells, the flavouring composition will thus vary accordingly, For example, typical flavouring compositions are comprised of salt solutions, barbecue flavour solutions or seasoned salt solutions. Other flavouring compositions such as chicken, flasour cream, sour cream and chives and various cheese flavours, cheese and meat (e.g, bacon), salt and vinegar, curries or other spices may also be used. For general purposes, the coating compositions employ an aqueous base but it will be understood that other carriers may be employed where it is desired to vary the flavour, texture or other characteristics of the product. For instance, edible oil carriers such as sunflower seed oil, corn oil, peanut oil or another vegetable oils may also be employed in which the flavouring agent is dissolved or suspended to form a solution and the solution utilized as a coating and quenching composition.

Typically, the flavouring agents may be employed in the solutions in minor concentrations ranging from e.g., 1 percent to 20 percent or more of the flavouring agent, calculated on a parts by weight basis to the carrier. The actual amount of the flavouring agent will depend on the degree of the flavour characteristic that is desired in th finished product, e.g, a heavier salt solution will provide a heavier coating and consequently a stronger salt flavour to the sunflower shells. In this respect, it has been found that in many cases, compared to prior art processes, the amount of flavouring agent that is required in the coating solutions can be significantly reduced by the process of the present invention since it has been found that the prior art processes when adding the flavouring agent during the actual roasting process results in the loss of the flavouring agent due to the elevated temperatures of the roasting procedure where the flavouring agents are likewise roasted. Thus, lower amounts of sometimes expensive flavouring ingredients can be used to achieve the same taste effect and without the added risk of converting the flavour of the flavouring agent to a "burned" taste where the flavouring agent is maintained at a high temperature during the roasting process.

An advantage of the present invention in obtaining a flavour coated composition is that the stronger coating adherence to the sunflower shells is believed to be at least partially due to the fact that at the point where the flavour coated compositions are applied to the shells, the shells and the nut or kernels are at the desired roasting temperature where the shells become more absorbent of the coating solution, thus also requiring a lower amount of the solution to achieve the desired effect. Another advantage of the process of the present invention is that the amount of heat energy required to achieve a satisfactory product can actually be reduced by following the teachings herein since the coating compositions, unless heated for use in a prior art type of application, will cool the product being roasted under prior art techniques, and thus require additional energy to bring the product back up to a roasting temperature. By carrying out the quenching utilizing the flavour solution, in effect, applicant is combining an energy saving step with the roasting process by avoiding the necessity of utilizing additional energy requirements to bring the product back up to a roasting temperature.

Using the above process, it has been found that depending on the type of flavouring agent used, the flavouring agent will actually penetrate the shell through to the nut or kernel in the shell, which will thus absorb or "pick-up" the flavour of the coating composition, which is a desirable attribute. In this way, a user may not only derive the flavour from the shell, but when the shell is discarded and the nut or kernel eaten, additional flavour will be evident in the product. Again, this is thought to be due to the fact that by applying the flavouring composition as a quench, the flavouring ingredients can more readily penetrate the shell after roasting has been completed as opposed to being driven off by the roasting process and temperatures.

Another feature of the present invention, by utilizing the above process, is the fact that the sunflower seeds, at the point where the quench solution containing the flavouring agent is applied to the shells, are all at substantially the same temperature so that substantially uniform control can be obtained in contrast to prior art techniques where, at the point where the flavouring solution is generally introduced part way during the roasting process, the shells may be at various temperatures in the same batch.

In carrying out the roasting process, the sunflower shells may be brought to an elevated temperature according to conventional techniques and using conventional equipment. Thus, typically, the sunflower shells are taken from storage at room or ambient temperature, and placed into a roasting oven which may be preheated if desired. Typically, the process is carried out as a batch process although continuous processing could be utilized if desired.

The roasting time, as is known by those skilled in the art will depend on several factors such as the type and size of sunflower seed, the degree of moisture in the shell and seed and as well depending on whether a "light" or "heavy" roasted is desired—i.e., whether a non-crispy nut or kernel is desired. Typically, roasting times will vary from 10 minutes to 50 minutes in a batch process, at average temperatures of about 42–50 degrees C.

During application of the flavour and quenching composition, it is most desirable that the sunflower shells be rotated or agitated in a substantially uniform manner to expose all of the sunflower shells to the coating solution. To this end, once the sunflower shells have reached the desired degree of roasting, the roasting heat may be terminated in a roasting oven (which will normally retain the roasting temperature for significant periods of time while the shells are in the oven), and immediately thereafter, the flavour and quenching solution introduced into the oven (preferably while the latter is rotating) to thereby stop or kill the roasting process and provide the flavour coating on the sunflower shells. In practice, a finely divided spray or atomized flavouring or quenching composition may be introduced into a rotating oven for a period ranging from several seconds to a minute or more, which in turn, will depend on the volume of sunflower shells to be treated, the concentration of the flavouring agent, and the temperature at the termination of the roasting process etc.

The flavouring and quenching solution preferably employs a finely divided spray or atomized droplets, which may be introduced by any suitable means, e.g., by one or more spray nozzles, directly into the roasting oven until the desired volume of flavour and quenching composition has been added to the roasted sunflower shells. In a most preferred form of the invention, course sprays, e.g., those sprays having a droplet size above 3 mm. should be avoided as this has been found to reduce the desired degree of uniformity of coating on the product. Most desirably, the droplet size is between about 0.5 and up to about 3 mm. Most preferred are sprays using a 40 lb. pressure spraygun with a nozzle rated for dispensing at 5 gallons per minute.

If desired, a "master batch" of flavouring ingredients can be formed and metered into a desired carrier—e g., water, which is then formed as an aqueous spray solution to apply to the roasting sunflower shells.

As noted above, the coating compositions should preferably form true solutions as in the case of salt or other flavouring ingredients being dissolved totally in the liquid carrier. On the other hand, not all flavouring ingredients can form true solutions with common carriers, and accordingly, depending on the type of flavouring agent, it may be necessary to form a homogenous dispersion of the flavouring agents in a carrier before spraying the composition onto the roasting shells.

After quenching, the resulting product can be permitted to cool to room temperature by exposure to suitable ambient atmospheric conditions; alternately, the product may be passed through one or more cooling zones using conventional apparatus for this purpose. Typically, packaging is carried out of the product of this invention at or below room temperature and after the product has cooled to a sufficient degree so that condensation of moisture of the water droplets does not occur in the packaged product. For conventional purposes, the product will normally be packaged in suitable plastic containers or alternately, vacuum packaged in metal or plastic containers in desired amounts.

DESCRIPTION OF PREFERRED EMBODIMENTS

Having thus generally described the invention reference will now be made to the accompanying examples illustrating preferred embodiments.

EXAMPLE 1

Sunflower shells containing seeds were cleaned using conventional techniques. Batches of 220 pounds were introduced into a rotating type roasting oven of conventional construction. Each batch was charged to the roasting oven while the oven was at room temperature or slightly elevated temperature (from a preceding batch).

The heat source for the oven was introduced and the shells brought up to roasting temperature, e.g., typically from 32 to 60 degrees C. temperature, while the oven was rotating. Roasting was carried out until the desired degree of roast was imparted to the seeds in the sunflower shells.

At the conclusion of the roasting sequence, that is when the desired degree of doneness was achieved, all of the sunflower shells were at a substantially uniform temperature and, 20 liters of a solution comprised of 10 kg salt (sodium chloride) to 15 U.S. gallons of water, at a temperature of between 5 and 20 degrees C. was directly sprayed as a fine spray onto the hot sunflower shells while the roasting oven was rotating. Spraying was achieved by a moveable single sprayer gun with a nozzle of 5 gallons per minute with 40 lbs pressure and was carried out until the 20 litres of solution was dispensed. Spraying took approximately one or two minutes, with the spraying acting as a quench whereby the roasting process was effectively terminated by lowering the temperature in the roasting oven from about 60 degrees to about 37 degrees. At this lower temperature, no further "cooking" of the seeds in the sunflower shells took place.

Thereafter, the product was removed from the roasting oven, and permitted to cool to room temperature (20 degrees C.) by exposure to atmospheric air. The resulting cooled product was analyzed for uniformity of coating, and appearance and taste tested. The results are described hereinafter.

EXAMPLE II

The procedures of Example I were repeated, using the same amount of sunflower shells, except in this case, the roasting process was interrupted at approximately 50 percent of the estimated time needed for roasting, by introducing into the roaster 20 liters a of "one-shot" coating solution comprised of 10 kg salt to 15 U.S. gallons of water. By "one-shot", it is meant to describe a conventional technique where a single pail containing the desired quantity of coating solution is charged all at once to the roasting oven and merely "dumped" onto the sunflower shells with no other steps or precautions being taken. In this manner, the roasting temperature was obviously effected by lowering the same and subsequently, roasting was carried out until it was judged that roasting had been completed to the desired degree.

After termination of the roasting, the roasting heat source was turned off, and the roasted sunflower shells and nuts were removed from the oven and permitted to cool at ambient temperature conditions. Such a process approximates the conventional technique for preparing roasted sunflower shells.

Thereafter, the product was studied for appearance, coating uniformity taste tested.

The product of this example was found to have approximately 60 percent of the individual shells nonuniformly coated or "spotted" which is a situation which occurs where the coating only adheres to a minor percent (20 or 30 percent) of the shell surface. Appearance wise, a sampling of the homogenous blended product showed results where there was a significant variation visually from roasted shell to roasted shell, giving effect of a non-uniform product which if packaged, would tend to indicate to a consumer that the product was not uniformly produced and was not visually appealing.

Taste tests of the product indicated that a percentage of the product, approximately 10 percent, was over-roasted while approximately 70 percent of the product from the batch could be considered to be "under-roasted". This is believed to be due to the fact that by using a "one-shot" feeding of the coating solution into the roasting oven during roasting, the solution obviously contacted only a certain percentage of the roasting sunflower shells while failing to contact others. Those that were contacted with the solution had their temperature lowered while the ones which were only partially contacted or not contacted at all remained at a roasting temperature so that by carrying out a roasting procedure until the average roasting time thought to be required for the batch was achieved, the shells which were not contacted or only partially contacted were in fact over-roasted while others which were totally saturated by coming into full contact with the coating solution were in fact under-roasted. The net result is that a non-uniform roasting of the batch is achieved by using this technique.

Moreover, the amount of adherence of the coating solution to the roasting shells was non-uniform as noted above, yielding a relatively poor appearance to the shells.

The products of Example I were stored for several months, opened and taste tested. All product was found to be in substantially the same condition as when packaged—i.e., there still remained a substantially uniform coating of the flavour composition on the sunflower shells.

EXAMPLE III

The procedures of Example I were repeated but in this case, a flavour coating composition of approximately 20 litres having a barbecue taste was sprayed onto the roasting sunflower shell. This coating composition was formed of 16 pounds of commercially available barbecue seasoning (consisting of spices, salt and other flavouring ingredients) dissolved and/or dispersed in 15 litres of water. The coating composition was homogenously blended until the soluble components were dissolved in the water carrier and non-soluble spices uniformly dispersed therein.

Taste tests of the resulting barbecue flavour coated roasted shells revealed a very pleasing and pleasant taste with no "burned" barbecue flavour which would have been expected if the barbecued seasoning had been introduced part way through the roasting process under conventional techniques. In fact, it was found that the barbecue seasoning penetrated through the shells to some extent whereby the sunflower nut or kernel absorbed some of the taste of the barbecue flavouring.

The product, like the product of Example I, was found to be substantially all uniformly coated with a fine dispersion of the flavouring ingredients adhering to the shell over substantially its entire surface. Thus, a very appealing product was achieved which had highly desirable taste characteristics penetrating through to the kernel or nut.

EXAMPLE IV

Again, the procedure of Example I was utilized but using a flavour coating composition of approximately 20 litres having a seasoned salt taste. This flavoured coating composition was formed of 16 pounds of commercially seasoned salt flavouring (consisting of salt and other flavouring ingredients) dissolved and/or dispersed in 15 litres of water and was sprayed onto the roasting sunflower shell. As in Example III, the seasoned salt flavouring composition was uniformly blended to dissolve all the soluble components in the water carrier and at the same time, the non-soluble spices were uniformly dispersed.

After taste tests were conducted, the seasoned salt flavoured coated roasted shells produced a very agreeable and pleasant taste with no "scorched" or "burned" taste which would have been expected under conventional techniques, where the seasoned salt flavouring is introduced part way through the roasting technique. Again, as in Example III, it was discovered that the seasoned salt flavouring penetrated to some extent through the shells whereby the sunflower nut or kernel absorbed some of the taste of the seasoned salt flavouring.

The resulting product, as in the product of Example I, was discovered to be substantially uniformly coated with a fine dispersion of the seasoned salt flavouring ingredients clinging to the entire surface of the sunflower shell. The resulting product, with the seasoned salt flavouring penetrating through to the kernel or nut, produced a high degree of desirable taste characteristics and an appealing product to view.

Similar products with different seasoning compositions may be produced using coating compositions of e.g., cheese flavours, sour cream or sour cream and chives, etc. The coating compositions will be formulated for spraying as taught above and in the case of particulate matter defined by e.g., chives, the particulate matter will be provided in a finely ground form sufficient to enable it to be dispersed through a nozzle for spraying purposes.

I claim:

1. A method of preparing roasted sunflower shells containing seeds having a generally uniform coating of a flavouring agent thereon, comprising subjecting raw sunflower shells containing seeds to an elevated temperature, roasting said sunflower shells, quenching and coating the resulting roasted sunflower shells after the seeds in the shells have been roasted to a desired degree, with a liquid flavour containing coating solution having a temperature below the roasting temperature, said quenching being carried out by spraying a finely divided liquid flavour containing coating solution onto said roasted sunflower shells while the roasted sunflower shells are at or near a roasting temperature, and while said sunflower shells are being agitated, and thereafter cooling the resulting coated sunflower shells to a temperature below at which the quenching step has been carried out.

2. A method according to claim 1, wherein said quenching step is carried out using an aqueous flavour composition.

3. A method according to claim 2, wherein said aqueous composition contains sodium chloride.

4. A method according to claim 1, wherein said quenching step is carried out using an edible oil based flavour composition.

5. A method according to claim 3, wherein the spraying step is carried out using a spray having a droplet size of less than 3 mm.

6. A method according to claim 3, wherein the spraying step is carried out using a spray having a droplet size of less than 0.5 mm. and 3 mm.

7. A method according to claim 1, wherein said flavour composition contains at least one of a salt, seasoning salt, meat seasoning, spice seasoning, cheese or cheese and meat and a barbecue flavoured seasoning.

8. A method according to claim 1, wherein said quenching and coating step is carried out by spraying a finely divided liquid coating composition onto said roasting sunflower shells.

9. A method according to claim 1, wherein said quenching and coating step is carried out by spraying an atomized coating composition onto said roasting sunflower seeds.

10. A method as defined in claim 1, wherein said cooling step is carried out by removing the resulting sunflower shells from the roasting step, and permitting said resulting shells to cool under ambient atmospheric conditions.

11. A method according to claim 1, wherein said sunflower shells are roasted to a temperature of between about 32° C. and about 100° C.

12. A method according to claim 1, wherein said sunflower shells are roasted to a temperature of between about 42° C. and about 50° C.

13. A method according to claim 1, wherein said sunflower shells are coated with a liquid flavour coating composition having a temperature of between about 5° to 30° C.

14. A method according to claim 1, wherein said sunflower shells are coated with a liquid flavour coating composition having a temperature of between about 10° to 20° C.

15. A method according to claim 1, wherein said sunflower seeds are roasted for between 10 and 50 minutes.

16. A method according to claim 1, wherein the spraying step is carried out using a spray having a droplet size of less than 3 mm.

17. A method according to claim 1, wherein the spraying step is carried out using a spray having a droplet size of less than 0.5 mm. and 3 mm.

18. A method according to claim 1, wherein said sunflower shells are roasted to a temperature of between about 32° C. and about 100° C., wherein said sunflower shells are coated with a liquid flavour coating composition having a temperature of between about 5° to 30° C., wherein said sunflower seeds are roasted for between 10 and 50 minutes.

19. A roasted sunflower shell product having improved properties characterized in that said sunflower shell has a substantially uniform coating of a flavouring agent thereon, and by the absence of any surface spotting.

20. The product of claim 19, wherein the product has been obtained by being roasted and quenched by spraying to stop the roasting of the product.

21. The product of claim 19, wherein the product has been obtained by cooling after quenching the coated sunflower shells.

22. The product of claim 19, wherein the coating comprises a salt coating.

23. The product of claim 19, wherein the coating comprises a member selected from the group consisting of a meat seasoning, spice seasoning, cheese or cheese and meat and a barbecue or seasoned salt coating.

* * * * *